United States Patent
Hurwitz

(10) Patent No.: US 8,336,558 B2
(45) Date of Patent: *Dec. 25, 2012

(54) DIRECT APPLICATION BRUSH HAVING FLOW REGULATOR ASSEMBLY

(75) Inventor: Marni Markell Hurwitz, Far Hills, NJ (US)

(73) Assignee: I Did It Inc., Far Hills, NJ (US)

( * ) Notice: Subject to any disclaimer, the term of this patent is extended or adjusted under 35 U.S.C. 154(b) by 474 days.

This patent is subject to a terminal disclaimer.

(21) Appl. No.: 12/589,002

(22) Filed: Oct. 16, 2009

(65) Prior Publication Data

US 2010/0143024 A1    Jun. 10, 2010

Related U.S. Application Data

(63) Continuation-in-part of application No. 11/880,249, filed on Jul. 20, 2007, now Pat. No. 7,926,492, which is a continuation-in-part of application No. 11/710,848, filed on Feb. 26, 2007, now Pat. No. 7,694,687, which is a continuation-in-part of application No. 11/349,638, filed on Feb. 8, 2006, now Pat. No. 7,322,364, which is a continuation-in-part of application No. 11/186,583, filed on Jul. 21, 2005, now Pat. No. 7,337,784.

(51) Int. Cl.
*A45D 24/22* (2006.01)

(52) U.S. Cl. .......................... 132/114; 132/112; 132/113

(58) Field of Classification Search .......... 132/112–116, 132/200; 119/603, 604, 651, 652, 664; 15/186, 15/187; 401/286, 287, 28
See application file for complete search history.

(56) References Cited

U.S. PATENT DOCUMENTS

| | | | | |
|---|---|---|---|---|
| 1,639,586 | A | * | 8/1927 | Boucher .......................... 401/28 |
| 2,736,049 | A | * | 2/1956 | Cohen .............................. 401/42 |
| 3,271,809 | A | * | 9/1966 | Morawski ........................ 401/42 |
| 3,981,106 | A | * | 9/1976 | Gallo .............................. 451/490 |
| 4,244,076 | A | | 1/1981 | Meyer .............................. 15/188 |
| 4,966,481 | A | * | 10/1990 | Satten et al. .................. 401/205 |
| 5,150,491 | A | | 9/1992 | Ikemoto ......................... 15/1.52 |
| 5,261,426 | A | | 11/1993 | Kellett et al. ................. 132/108 |
| 5,626,099 | A | | 5/1997 | Staller et al. .................. 119/625 |

(Continued)

*Primary Examiner* — Robyn Doan
(74) *Attorney, Agent, or Firm* — Ernest D. Buff; Ernest D. Buff & Assoc. LLC; Margaret A. LaCroix

(57) ABSTRACT

A brush assembly releases a fluid and/or liquid solution directly onto a surface, such as a coat of an animal during grooming, or onto inanimate surfaces such as vehicles. The brush assembly includes a molded brush having a plurality of apertures integrated therein for delivery of a fluid. At least one base plate with grooming implementations, such as bristles or a sponge, is interchangeably attached to the brush base. An ergonomical handle is provided having a palm conforming top and finger indentation sides constructed to form an internal cavity. The ergonomical handle is ambidextrous in nature for interchangeable left and right handedness. A center cylinder is located within said internal cavity of said ergonomical handle and includes a bladder which aligns with the mid portion of the brush base for fluid delivery controlled upstream by a flow regulator. An optional mixing chamber housing a water soluble compound containing active ingredients may be attached to the flow regulator to form a liquid solution. The fluid and/or liquid solution is delivered directly to the surface during grooming.

25 Claims, 11 Drawing Sheets

U.S. PATENT DOCUMENTS

| | | | |
|---|---|---|---|
| 5,632,289 A * | 5/1997 | Sharp | 132/116 |
| 6,076,223 A * | 6/2000 | Dair et al. | 15/167.1 |
| 6,450,127 B2 | 9/2002 | Willinger et al. | 119/663 |
| 6,543,388 B2 | 4/2003 | Willinger et al. | 119/663 |
| 6,575,174 B2 | 6/2003 | Lee | 132/160 |
| 7,509,925 B2 * | 3/2009 | Embry | 119/603 |

* cited by examiner

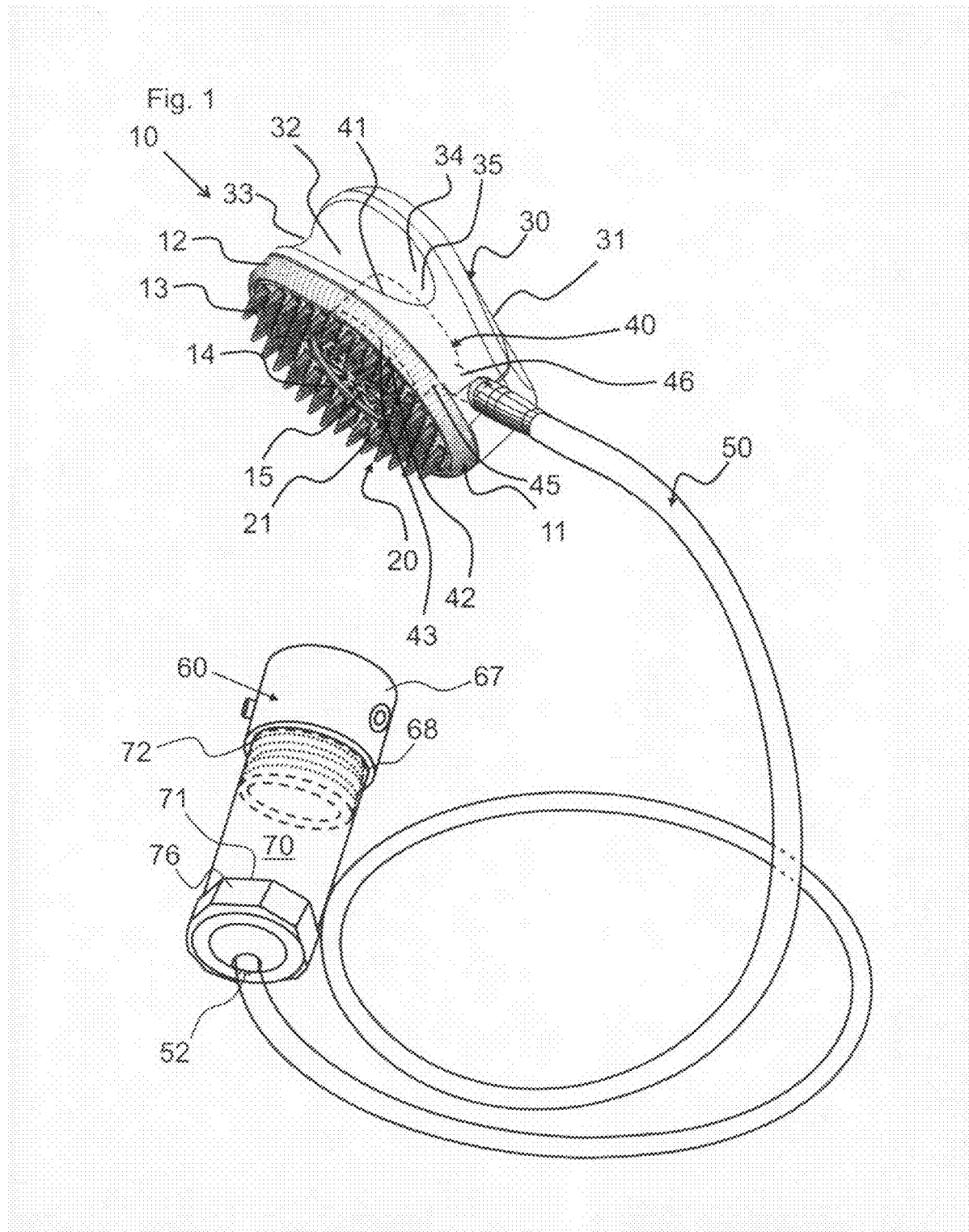

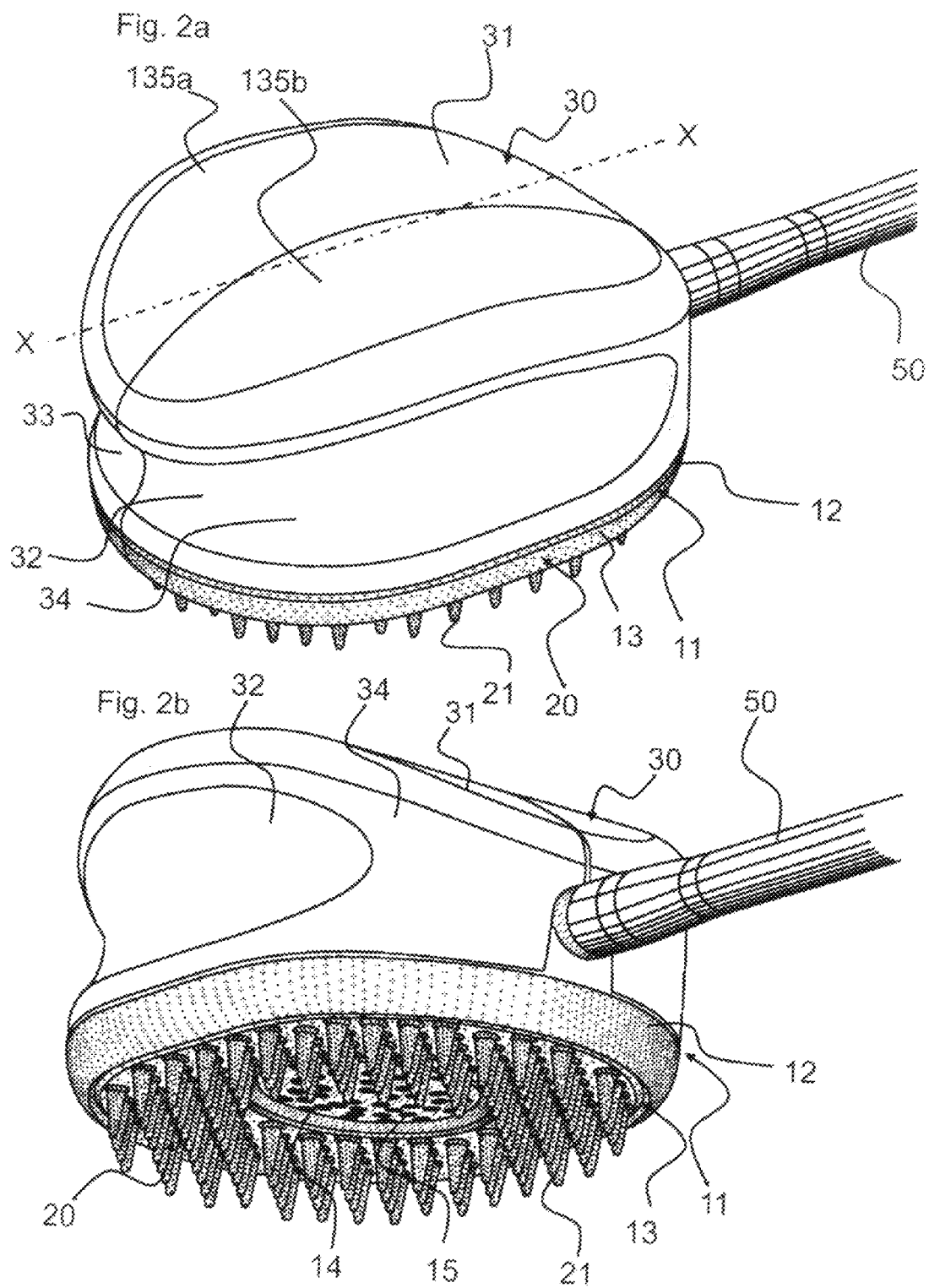

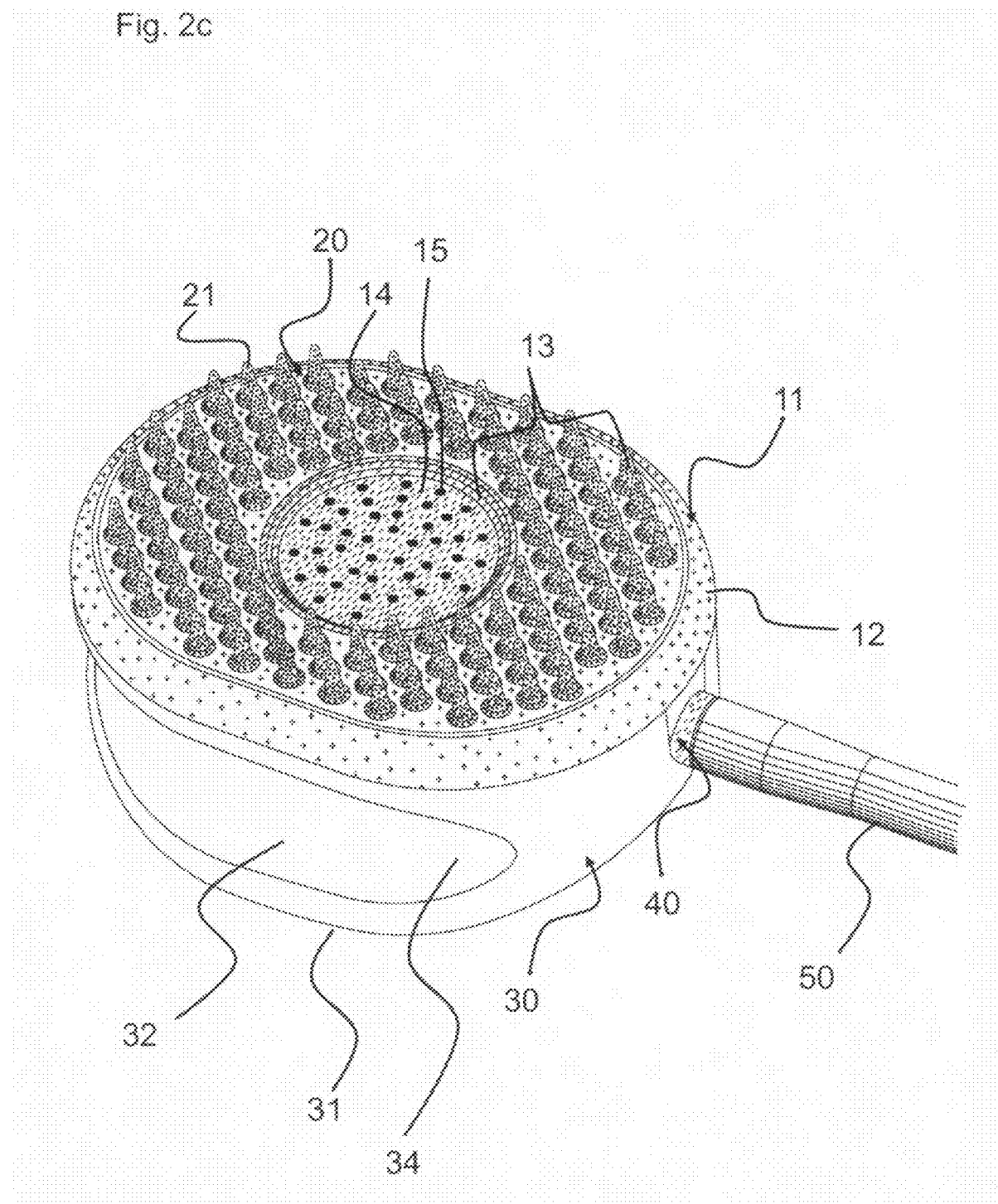

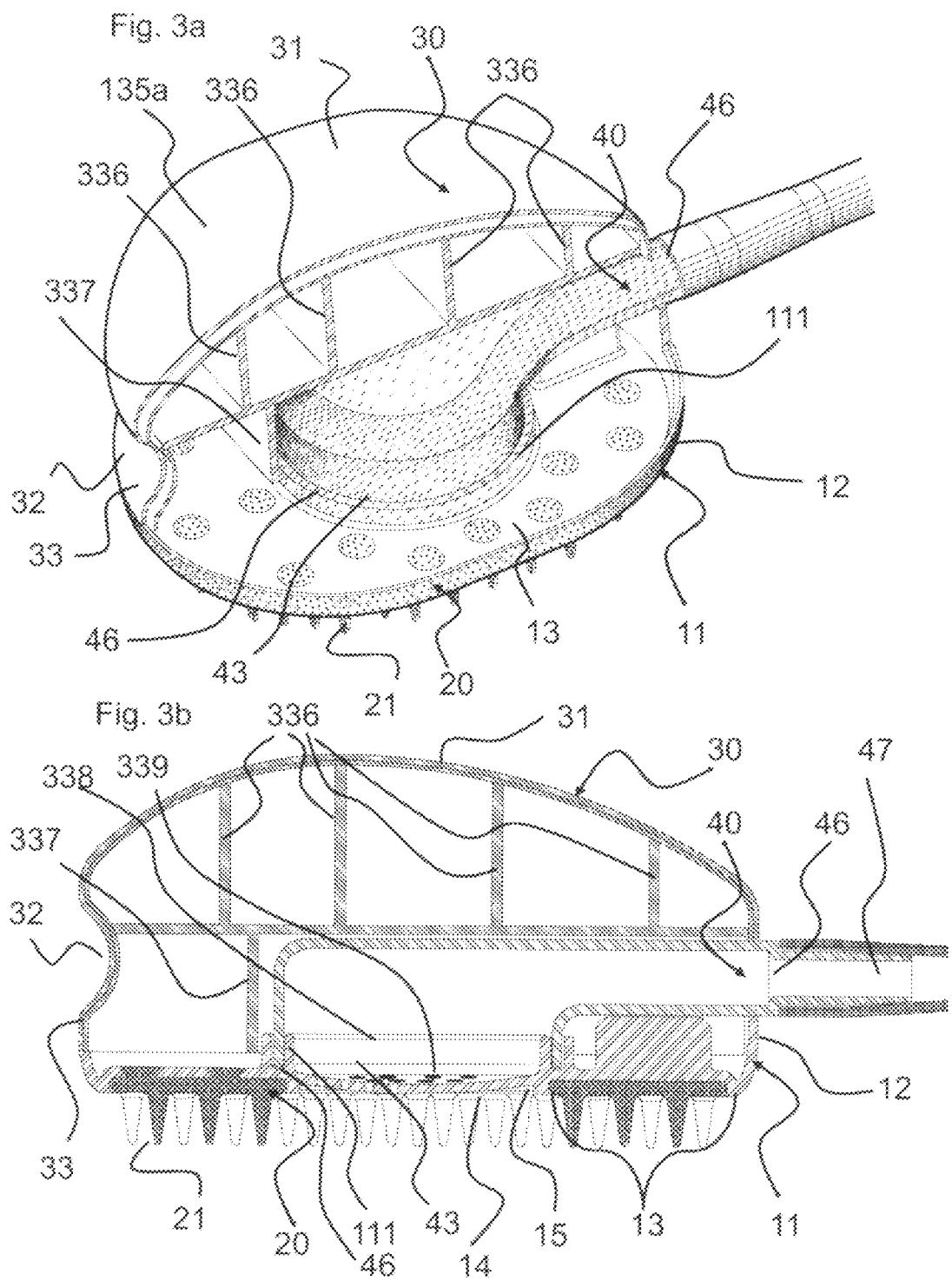

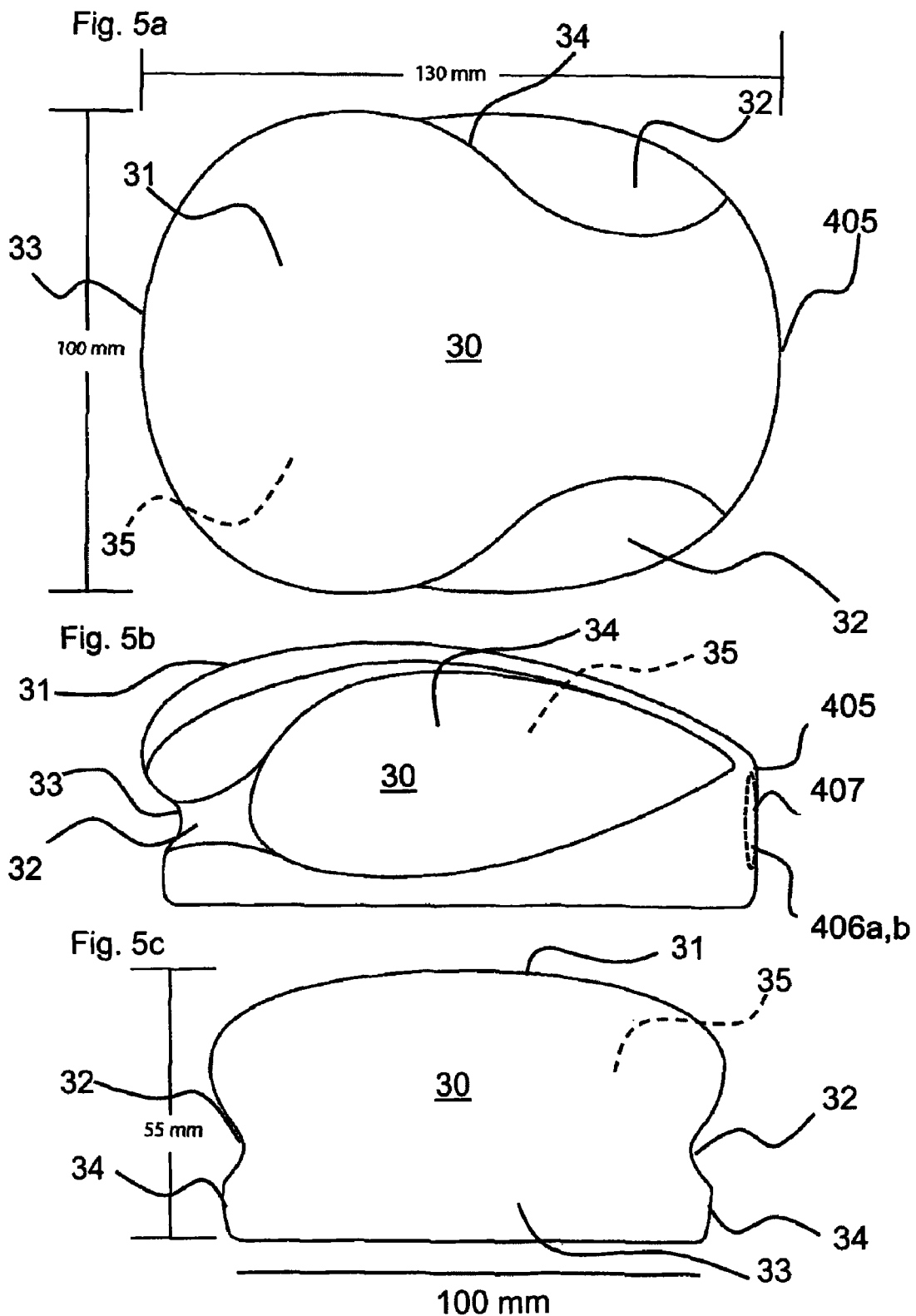

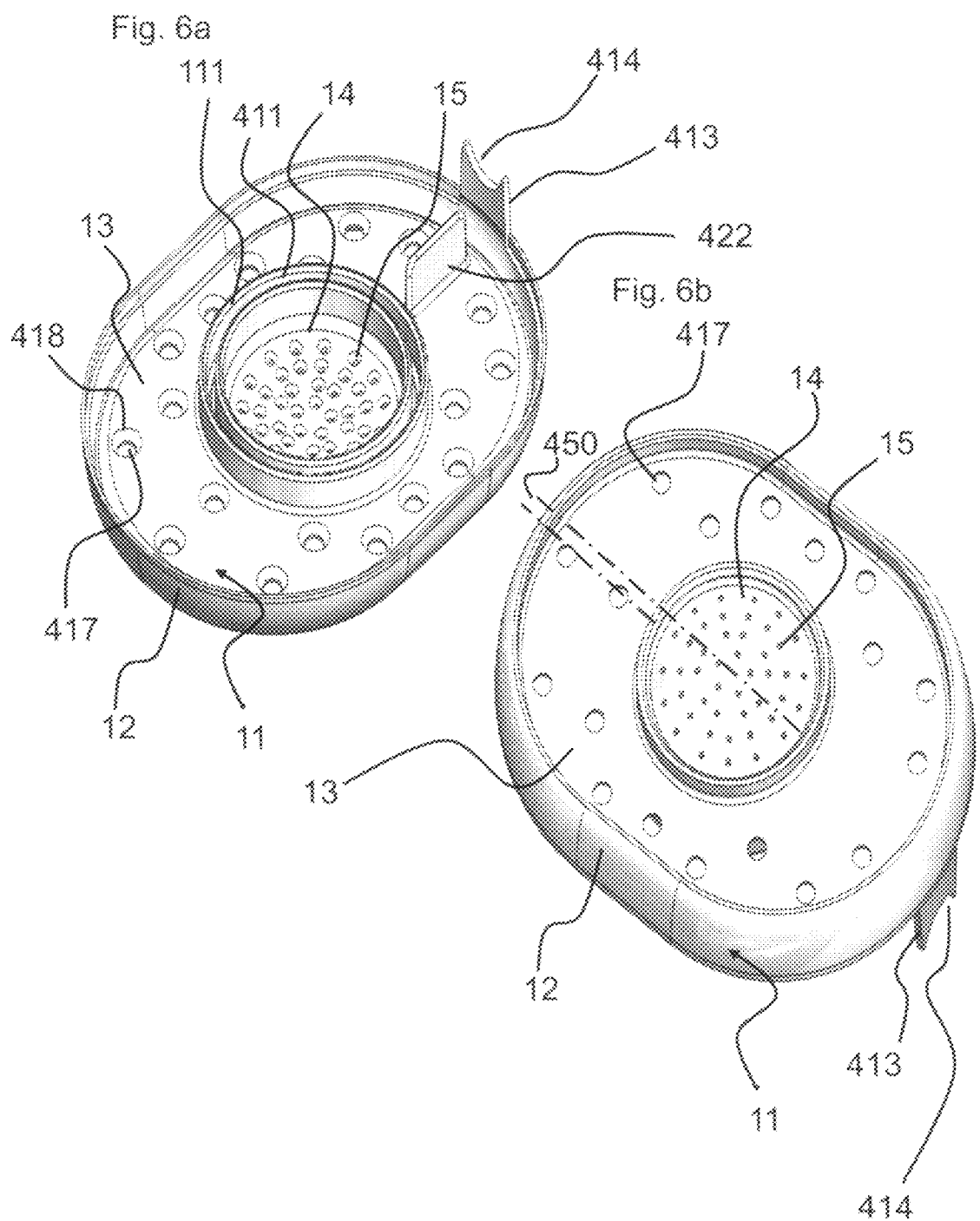

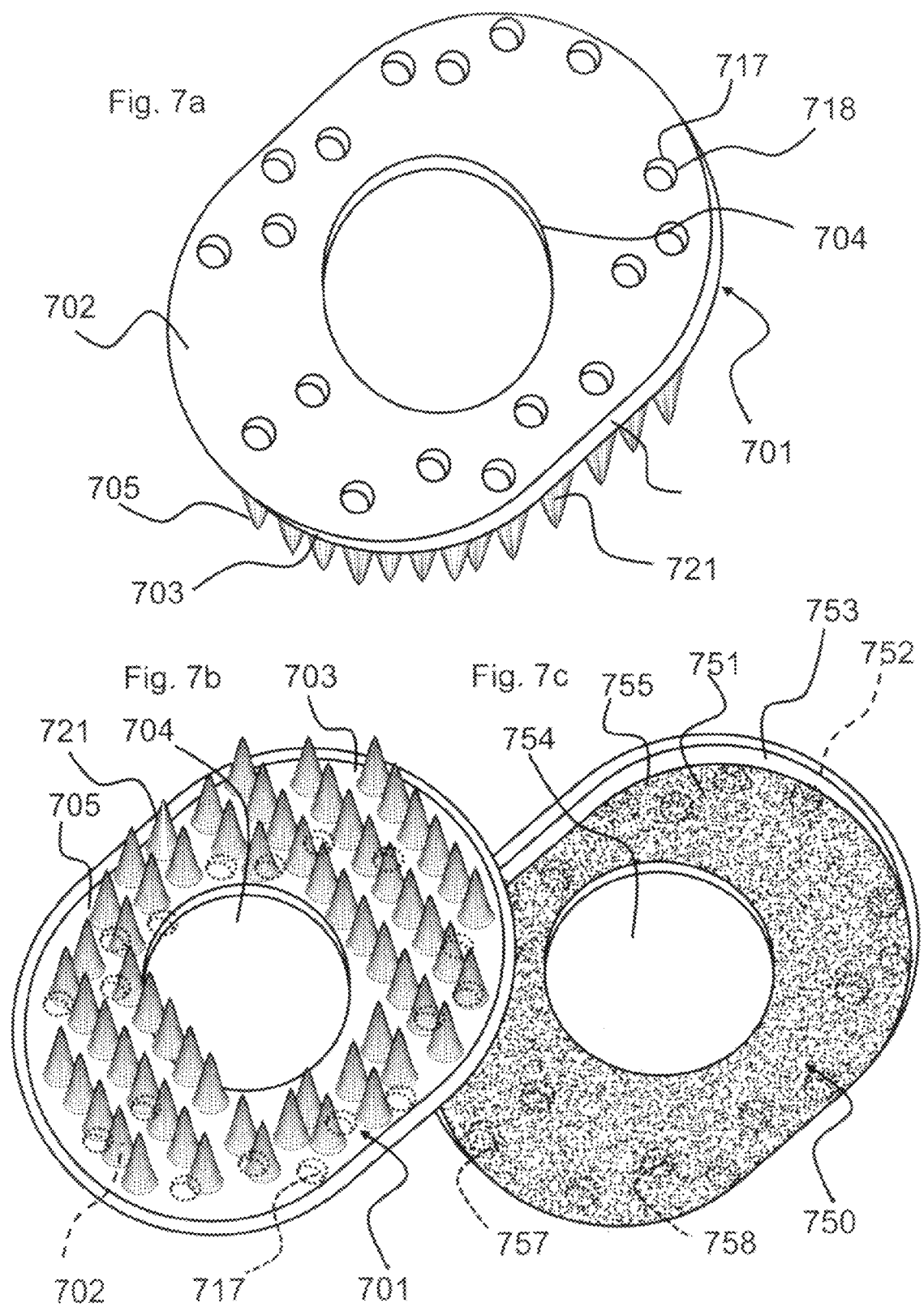

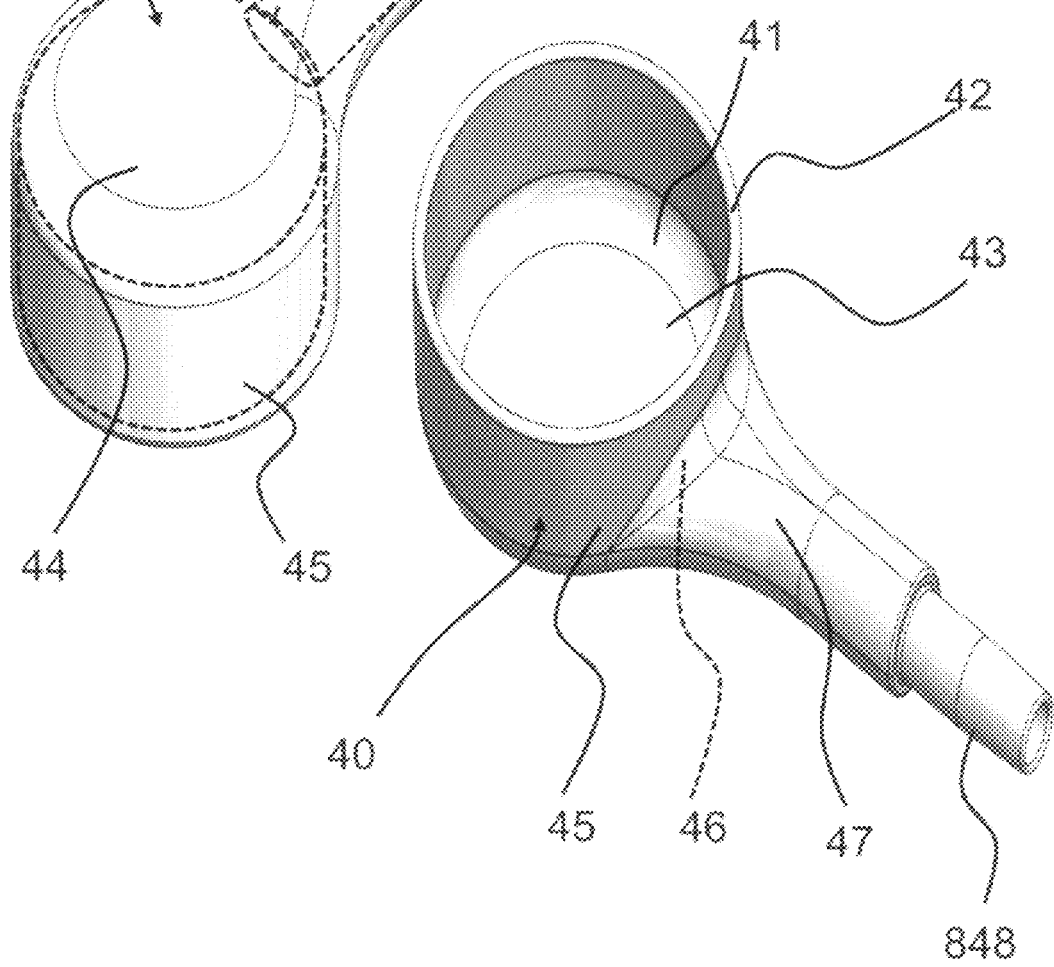

DIRECT APPLICATION BRUSH HAVING FLOW REGULATOR ASSEMBLY

CROSS-REFERENCE TO RELATED APPLICATIONS

This is a Continuation-In-Part of application Ser. No. 11/880,249, filed Jul. 20, 2007 now U.S. Pat. No. 7,926,462, for "Direct Application Horse And Livestock Brush Having Flow Regulator Assembly", which in turn is a Continuation-In-Part of application Ser. No. 11/710,848, filed Feb. 26, 2007 now U.S. Pat. No. 7,694,687, for "Direct Application Brush For Horses and Livestock That Releases Active Ingredients" which, in turn, is a Continuation-In-Part of application Ser. No. 11/349,638, filed Feb. 8, 2006 now U.S. Pat. No. 7,322,364, for "Hairbrush for Pets and People that Releases Active Ingredients", which, in turn, is a Continuation-In-Part of application Ser. No. 11/186,583, filed Jul. 21, 2005 now U.S. Pat. No. 7,337,784, for "Hairbrush for Pets and People that Releases Active Ingredients", the disclosures of which are hereby incorporated in their entirety by reference thereto.

BACKGROUND OF THE INVENTION

1. Field of the Invention

The present invention relates to a direct application brush assembly having a plethora of applications, including for pets, domesticated animals, horses and livestock for grooming, as well as for washing inanimate objects, including cars, or other items. The brush assembly is appointed with a flow regulator and lightweight hose for fluid delivery onto fur or hair or onto a surface to be cleaned or treated; and more specifically to a brush assembly which, during brushing or treatment, releases fluid fed through a hose associated with a flow regulator that is, optionally, attached to a mixing chamber containing a compound having active ingredients soluble in water to form a liquid solution appointed to be delivered through the hose into the brush and released into the surface, fur or hair. Active ingredients delivered through the liquid solution include therapeutic or moisturizing compounds, antibacterial compounds, insect repellant, flea and/or tic compounds, hair-conditioning and detangle products, sun protection lotions, mane and tail whiteners and stain removers, dye compositions, fragrances or other hair-related products, waxes or cleaning products.

2. Description of the Prior Art

Many patents address issues related to brush designs having a number of bristles adapted to provide desired brushing action. Brushes for pets, horses and livestock typically incorporate harsh bristles, while those for humans are typically provided with softer bristles. Several patents disclose coating bristles with desired compositions in order to deliver these compositions to the brushed hair.

U.S. Pat. No. 4,244,076 to Meyer discloses a method and forming tool for the fabrication of a bristle support for a brush, especially a brush. The method involves attaching pin-like bristles to a bristle support or carrier for a hairbrush. In a first step the rows of bristle pins are interconnected with one another at their rear end by means of a web. The individual bristle pin rows are retained in their position by the web. In a next step the bristle pins, at the region of their rear ends, together with the webs, are cast in the material of the bristle support, so that the bristle pin rows are embedded in the bristle support. In this method, the bristle support or carrier is incapable of delivering perfume or other active compositions to the hair or fur being brushed.

U.S. Pat. No. 5,150,491 to Ikemoto discloses a hairbrush adapted to prevent static charging of the bristles and hair. It has a multiplicity of small holes formed in a conductive brush base that carries a row of antistatic members. The antistatic members are relatively stiff. They are prevented from bending down, and render the brush easy to draw through hair, thereby facilitating smooth brushing. The conductive brush base is solid. It cannot deliver perfume or other active compositions to hair or fur, but merely eliminates the static present in the hair and bristles by conducting charges that are present.

U.S. Pat. No. 5,261,426 to Kellett, et al. discloses a hydrophilic foam pad for hair styling. The hair conditioning and styling pad has a shaped body of a resilient, open-celled, hydrophilic polyurethane foam matrix integrally incorporating an aqueous phase incorporating about 70-90% water, about 5-25% of a hair conditioning agent, and a nonionic surfactant. The bristles or tines of a brush contact the resilient pad and transfer the aqueous hair styling composition to the brush so that the composition is subsequently transferred to the hair as it is being styled. This styling device requires periodic contact with the resilient pad to recharge the bristles, and does not by itself deliver perfume or other active compositions to hair or fur.

U.S. Pat. No. 5,626,099 to Staller, et al. discloses a therapeutic groomer. This hand-held grooming device grooms, massages, and provides magnetic therapy for animals. The device has a base that is configured to be hand-held. On the base, there is formed a grooming pad having projections adapted for grooming and massaging. The grooming pads are formed by either a plurality of parallely arranged strips, each having magnetic properties, or a single magnetic sheet. Each strip has its magnetic poles aligned uniformly so that its longitudinal ends are polar opposites. The therapeutic groomer does not deliver perfume or active compositions to the hair or fur being groomed.

U.S. Pat. Nos. 6,450,127 and 6,543,388 to Willinger, et al. disclose an ergonomic handle for a grooming brush. This brush handle is formed with a continuously arched upper surface portion and a lower surface portion separated by a humped semicircular ridge. One of the lower arched portions forms a trigger grip for a single finger held in either a forehand or backhand grip. The handle is covered with a high friction material in the form of a contoured rubber or elastomeric sleeve, which is stretched over a molded plastic handle. These patents relate only to the shape of a handle of a hairbrush and do not disclose a brush that delivers perfumes or other active ingredients to brushed hair or fur by way of flow regulation of fluid fed into a cavity within the brush.

A hairbrush commercially marketed by JW Pet Company (Hasbrouck Heights, N.J.) incorporates an ergonomic handle disclosed in U.S. Pat. Nos. 6,450,127 and 6,543,388. It uses a polymeric molded closed elliptical cavity which includes a thick elliptical rubber element carrying multitudes of metallic bristle pins with rounded tips. The distal end of the bristle pins opposed to the rounded tips carries nail heads, which rests against and are glued to a thick rubber element using rubber cement or similar glue. The bristle pins in the rubber element form an air leak-tight seal. The elliptical rubber element has a single hole appointed for discharging air. This elliptical rubber element with attached pins is squeezed into the closed elliptical cavity of a polymeric molded brush and the rubber element adopts a concave shape with the pins sticking out in a non-planar configuration. During use, pressure is applied to the pins in the middle portion of the elliptical rubber element of the brush. The air entrapped in the cavity formed by the rubber element and elliptical cavity is squeezed by the pressure applied, thereby providing a springy feel, while the entrapped air is released through the single hole present in the elliptical rubber element. This brush has a single air outlet and discharges air entrapped in the elliptical cavity of the brush. It has no means available for delivering a perfume or other active ingredients to the brushed hair or fur.

U.S. Pat. No. 6,575,174 to Lee discloses a hair grooming brush having a plurality of rows of curved wavy bristles, rather than traditional straight bristles commonly found on brushes and combs. The curvature of the bristles produces springiness to the bristles when pressure is applied during the combing action. The springiness of the numerous rows of bristles translates into a massaging effect upon the hair and scalp. The brush does not include a brush base with a plurality of apertures for delivery of perfumes or other active compositions to the hair or fur being brushed.

There remains a need in the art for an easy to use brush assembly having application in cleaning/treating inanimate surfaces, such as cars, and/or for grooming animals, particularly domesticated pets and/or horses and livestock, that continuously delivers fluid directly to the surface, hair, mane, and/or fur. Specifically, there is a need in the art for a brush assembly providing a brush base fitted with an interchangeably base plate, having a bladder attached to a flexible hose having a flow regulator upstream for controlled fluid delivery fluid through a centralized portion of the brush base. The remains a need in the art for a brush assembly that is constructed having an ergonomical handle having a palm grip to portion and sides configured with finger indentations so that the handle is ambidextrous in nature and can be used comfortable and interchangeably by left and/or right handed users. Also, there remains a need in the art for a brush assembly that can be connected to a mixing chamber to form a liquid solution containing active ingredients, including one or more active ingredients, such as perfume or other active compositions, appointed to be continuously delivered to the surface, hair, mane, and/or fur of animals.

SUMMARY OF THE INVENTION

The present invention discloses a lightweight brush assembly having a brush base engaged with a central cylinder having a fluid bladder that is appointed with a hose and a flow regulator for controlled delivery of a fluid or liquid solution directly to a surface and/or an animal's fur. The brush base includes a mid portion having a plurality of apertures integrated therein that is in alignment with a primary opening of a bladder constructed within a center cylinder housed within an internal cavity of an ergonomical handle. The center cylinder includes a side wall having an orifice integrated therein for attachment to a hose for continuous fluid delivery. A flexible, deformable membrane having a plurality of apertures align with the apertures of the mid portion of the brush base may be integrated within the primary opening of the center cylinder, and/or a deformable membrane having a plurality of apertures may be compose the mid portion of the brush base. In turn, the interchangeably base plate may include bristles preferably protruding from a deformable membrane holing the bristles. The interchangeable base plate may be constructed with varying grooming tools, such as bristles, teeth, massaging protuberances, or a sponge or scrubber. Preferably, the interchangeable base plates simply snap off from the brush base for replacement. Base plates including teeth or bristles may be provided for use in scrubbing or cleaning the scalp of an animal, while base plates having rounded protuberances/fingers (more rounded design) grooming implements may be used for less penetrating or massaging purposes. Sponge like materials for softer applications may be integrated into another base plate for use on hard surfaces, or inanimate objects such as cars, hard surfaces, etc. In another embodiment, teeth or bristles of the direct delivery brush are constructed to also deliver water and or shampoo, treatment, or used with center cylinder for surface purposed only.

The primary opening of the center cylinder is aligned with the mid portion of the brush base so that a continuous liquid delivery path is provided though the plurality of apertures integrated within the mid portion of the brush base. The edges of the primary opening of the center cylinder are tightly fitted to or permanently bonded to the mid portion of the brush base, thereby forming a substantially leak tight seal. The orifice of the center cylinder is fitted with a hose which is attached to a flow regulator so that the hose delivers a fluid from the flow regulator into the bladder of the center cylinder and through the apertures of the mid portion of the brush base onto the surface and/or animal's coat.

Optionally, a mixing chamber may be attached to the flow regulator, wherein the mixing chamber houses a soluble compound with an active composition which dissolves in water delivered from the flow regulator to form a liquid solution that is fed into the bladder of the center cylinder. The liquid solution contains a desired liquid gel of perfume or fragrance or other active compositions such as insect repellants, hair-conditioning products, dye compositions, moisturizing ingredients, antibacterial compounds, and the like. When hair or fur is brushed with the brush of the subject invention, the flow regulator is turned on and adjusted according to the desired flow rate and the fluid and/or liquid solution containing fragrance or perfume or other active composition is released to the hairs or fur of the coat being brushed or sponged through the fine apertures provided within the mid portion of the brush base transferring the fluid, solution, liquid, or gel with perfume, fragrance or active ingredient to hairs or fur of the coat during brushing or sponging treatment. The brush may be used for inanimate objects as well, such as cars, or other items.

The direct delivery brush has a lightweight construction and an ergonomic design. Advantages developed from the light-weight ergonomic design include better balance and improved control over bristle flexibility while directly delivering solution to the animal's coat/or to the surface, depending on the application. Inasmuch as the water feed is centralized and mixing occurs upstream from the brush base, the brush has ultra-light weight and is highly reliable in operation. The ergo-dynamic design of the handle construction yields a grip that it is ambidextrously comfortably designed for both the right handed as well as left handed person. Side indentations are provided in the handle construction for placement of the thumb and fingers. Indentations are duplicated on both sides of the handle for ambidexterity of the handle.

A cylinder having a bladder is used in the center of the brush for delivery of shampoo and water, while interchangeable base plates are appointed to be attached to the brush base for scrubbing, massaging and/or sponging the animal's fur/surface. The center cylinder affords a concentrated area for liquid, shampoo and the like, for a more balanced utility piece. A flow regulator for water pressure is utilized which is attached upstream from the hose. What is more, the ergonomical handle is preferably textured for less slippage when being used. Preferably, the brush would be composed of a polymeric material, polycarbonates, polypropylenes, etc., through injection molding, for keeping the brush lightweight. As another addition to a textured top portion of the ergonomical handle, a padded gel like material may also be included to enhance comfort of the handle during use of the brush. The pad surface may be a fast drying material such as a gel like material or foam material to provide a cushioned top surface.

The subject brush provides a three-in-one brush preferably having a "clamshell" ergonomical handle configuration, which is durable, simple to assemble and provides support for an internal water compartment. Texture or frictional coatings may be applied to the handle to mitigate slippage while the brush is being used. Water is efficiently directed to the bladder of the center cylinder and fed through the apertures in the mid portion of the brush base. The integrated bladder provided within the brush facilitates water delivery through, while at the same time minimizing the amount of water inside the brush keeping it light and easier to handle. The bladder/internal water compartment conforms to a standard water tube. The water faucet holes or plurality of apertures integrated within the mid portion of the brush base are centrally located in the bottom of the molded base, which will distribute the water more evenly through the base to the surface/fur wherein the comb "teeth" on the interchangeable base plate manipulates the fur or hair. The soft comb "teeth" are preferably over-mold directly onto the base plate to provide near perfect adhesion for serious scrubbing while protecting the surface/animal from being harmed. Bristles with fine apertures may be provided, which may be attached to a flexible deformable membrane forming the base plate, in numerous ways. The bristles may be molded together by injection molding or similar processes with the deformable membrane, as a unitary body with the apertures in the flexible deformable membrane matching the central aperture in the bristle. In a second embodiment, the bristles may comprise apertures that are U shaped so that the aperture not only brings the liquid gel perfume, fragrance or active agent to the tip of the bristle, but also delivers along the length of the bristle. In this embodiment, the bristles deliver the fluid and/or liquid solution containing perfume, fragrance or active ingredient along its entire length and any hairs or fur of the coat contacting the bristle is coated with the liquid gel of fragrance, perfume or active ingredient.

The brush is assembled first by forming the component parts, including: (i) forming a brush base having an outer perimeter portion, perimeter shelf portion and a mid portion with a plurality of apertures integrate therein for delivery of a fluid; (ii) forming at least one base plate having grooming implementations integrated therein being received on the perimeter shelf portion of the molded brush base; (iii) forming a center cylinder comprising a bladder with a bottom surface having a primary opening, a top surface, and a side wall having an orifice; and (iv) forming an ergonomical handle having a palm conforming top and finger indentation sides constructed to form an internal cavity, the ergonomical handle being ambidextrous in nature for interchangeable handedness. In assembling, the primary opening of the center cylinder is aligned with the mid portion of the brush base and attached thereto. The ergonomical handle is attached to the outer perimeter portion of the brush base so that the center cylinder is located within the internal cavity. A second end of a hose is connected to the orifice of the side wall of the center cylinder, and a first end of the hose is connected to a flow regulator for delivery of the fluid into the bladder of the center cylinder. During application, the fluid is delivered to bladder of the center cylinder and released through the apertures in the mid portion of the brush.

The liquid perfume, fragrance or active ingredient has a contact angle sufficiently low, typically in the range of 1 to 30 degrees with respect to the bristle material so that the liquid penetrates the fine apertures provided within the bristles. If the contact angle is significantly larger, the penetration of the liquid gel within the apertures of the brush base is compromised.

Significant advantages are realized by practice of the present invention. The key features of the direct application brush assembly include, in combination, the features set forth below:

1) a brush base having an outer perimeter portion, perimeter shelf portion and a mid portion with a plurality of apertures integrate therein for delivery of a fluid;

2) at least one base plate having grooming implementations integrated therein being received on the perimeter shelf portion of the molded brush base;

3) the base plate being interchangeable to suit varying grooming needs;

4) an ergonomical handle having a palm conforming top and symmetric finger indentation around front and side walls constructed to form an internal cavity and being attached to the outer perimeter portion of the brush base;

5) the ergonomical handle having an ambidextrous construction for interchangeable handedness so that it can comfortably be used by left and right handed users;

6) a center cylinder being located within the internal cavity of the ergonomical handle and comprising a bladder with a bottom surface having a primary opening, a top surface, and a side wall having an orifice;

7) the primary opening of the center cylinder being adapted to align with the mid portion of the brush base for delivery of fluid therethrough;

8) optionally, a porous sponge or soluble disk saturated with water soluble formulation of fragrance, perfume and/or other active composition may be inserted within the bladder of the center cylinder. The optional porous sponge is arranged so that it rests on the mid portion of the brush base and bladder of the center cylinder, to dissolve and mix with the water soluble formulation saturated within the porous sponge;

9) a second end of a hose is connected to the orifice of the center cylinder, and a first end of the hose is connected to a flow regulator for controlled delivery of a fluid into the bladder of the center cylinder and visa vie internal cavity of the brush base;

10) optionally, a mixing chamber containing a substantially water soluble compound having an active ingredient may be attached to the flow regulator so that as water travels through the flow regulator into the mixing chamber the compound is dissolved to form a liquid solution; and 11) the user may periodically replace the optional mixing chamber with a fresh mixing chamber when the perfume, fragrance and/or other active composition is exhausted;

whereby the user of the brush of the subject invention is provided with the capability to saturate the hairs or fur of a coat being brushed, or surface of an inanimate object, with water, a perfume, fragrance and/or other active compositions including insect repellant, hair conditioning products, dye compositions, moisturizing ingredients, antibacterial compounds, and the like.

BRIEF DESCRIPTION OF THE DRAWING

The invention will be more fully understood and further advantages will become apparent when reference is had to the following detailed description of the preferred embodiments of the invention and the accompanying drawings, in which:

FIG. 1 is a schematic view of an embodiment of the brush assembly in the assembled conditions, showing the brush base, base plate, ergonomical handle, center cylinder, hose and flow regulator, which in turn is attached to the optional mixing chamber;

FIG. 2a is a top view of the embodiment of the brush assembly of FIG. 1, shown in the assembled condition;

FIG. 2b is a bottom-side view of the embodiment of the brush assembly of FIG. 1, shown in the assembled condition;

FIG. 2c is a bottom view of the embodiment of the brush assembly of FIG. 1, shown in the assembled condition;

FIG. 3a shows a cut-away view of FIG. 2a taken at X-X;

FIG. 3b shows a cross-sectional view FIG. 2a taken at X-X;

FIG. 5a illustrates a top plane view of the ergonomical handle;

FIG. 5b illustrates a side plane view of the ergonomical handle;

FIG. 5c illustrates a front plane view of the ergonomical handle;

FIG. 6a illustrates a top/internal view of the brush base;

FIG. 6b illustrates a bottom/external view of the brush base;

FIG. 7a illustrates a bottom view of an embodiment of base plate having bristle elements;

FIG. 7b illustrates a top view of the base plate of the embodiment of FIG. 7a with bristle elements;

FIG. 7c illustrates a top view of another embodiment of base plate having a sponge element;

FIG. 8a illustrates a top view of the center cylinder;

FIG. 8b illustrates a bottom view of the center cylinder;

FIG. 9b shows a top view of an alternative embodiment of the base plate constructed in FIG. 9a;

FIG. 9c shows a bottom view of an alternative embodiment of the base plate constructed in FIG. 9a.

DETAILED DESCRIPTION OF THE INVENTION

Figure 4:
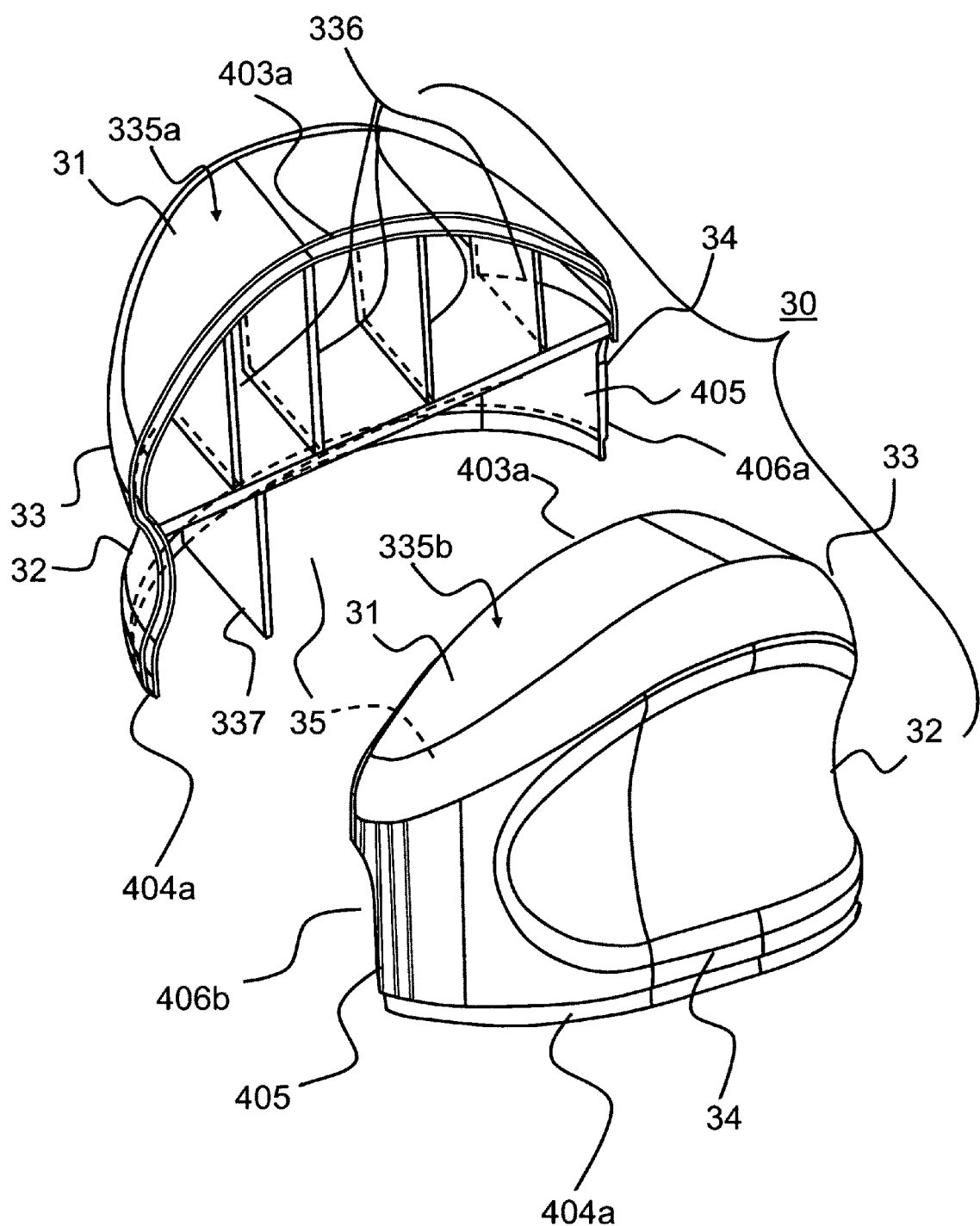
FIG. 4 illustrates the construction of the ergonomical handle.

This invention relates to a brush and flow regulator with hose assembly for use with animals such as domestic pets, horses and livestock, or inanimate objects, such as cars or other surfaces needing cleaning and/or treatment. The brush assembly of the subject invention releases fluid, such as water, and/or a solution containing active compounds in substantially liquid form onto the surface, fur, hair, mane, and/or coat of the animal penetrating follicle depths. Fluid flow is controlled by the flow regulator, which feeds fluid into a hose which delivers the liquid into a bladder of a center cylinder located in an internal cavity of the brush which is associated with a brush base for release through apertures and onto the surface, fur or hair. A mixing chamber housing an active substantially water soluble compound may be attached to the flow regulator to mix with water to form a liquid solution that is delivered into the bladder of the center cylinder of the brush. Active ingredients delivered in the liquid solution include waxes, cleaners, fragrances, therapeutic or moisturizing compounds, hair-conditioning and detangle products, sun protection lotions, mane and tail whiteners and stain removers, dye compositions and other hair-related products, antibacterial compounds, flea and/or tic compounds, and insect repellant or the like. Direct delivery of the active compound onto the surface, coat and mane of the animal provides optimal penetration and effectiveness of the product's treatment. Upon exhaustion of the liquid solution, water may continuously pass through the flow regulator into the hose to flush the assembly as well as rinse and finish cleaning the surface or animal.

Fundamental advantages to the novel design of the subject brush assembly include the ergonomical handle construction which is molded having sides with finger indentations integrated therein allowing for a more comfortable grip and a more substantial hold, which appeals to both the left and right handed persons, making the handle ambidextrous. What is more, the ergonomical handle includes a palm grip area which uniformly molds to the user's palms. The ergonomical handle can be textured for less slippage during used as soap and water are released from the brush. Preferably, the ergonomical handle, as well as all component parts of the brush, is constructed of plastic, preferably a thermoplastic, i.e. polycarbonates, polypropylenes, etc., through injection molding, for keeping the brush lightweight. As another addition to the textured top portion of the ergonomical handle, a padded gel like material may also be integrated within the exterior, particularly in the palm region and/or the finger indentation region, for an enhanced comfort experience when holding the hand held piece. The center cylinder affords a concentrated area for liquid, shampoo and the like, for a more balanced utility piece, while the base plates for the brush base may be provided as "snap" off extensions to provide varying grooming tools. For example, a base plate may be provided that include grooming tools comprising: teeth or bristles used for scrubbing and reaching the scalp are of an animal; rounded teeth or rounded fingers used for massaging the scalp of an animal; or a sponge like material for softer applications. What is more, where teeth or bristles are provided, the base plate may be formed with channels in the teeth or bristles that allow water/or solution delivery through the teeth or bristles in addition to the apertures located in the brush base. Preferably the apertures have a diameter ranging from 0.005 inch to 0.060 inches.

The brush yields ergonomic features by way of its ergonomical handle construction. Preferably, the ergonomical handles has measurements of 4"×5"×2" to provide excellent gripping force for longer period of time for the average sized user. The ergonomical handle construction provides ambidexterity so both left and right-handed users can use it comfortably. The symmetric finger indentations extend around the front and sides of the brush to provide the user with an excellent gripping surface. The top rounded surface on the ergonomical handle provides a more comfortable interface for the palm and fingers, which also add to the gripping comfort. The ergonomical handle is preferably constructed of PC-ABS blend, or alternatively ABS, keeping the brush lightweight while maintaining durability. Preferably the brush base is constructed with Santoprene™ or a thermoplastic elastomer (TPE) over-mold to provide durability while protecting the scrubbing surface as it provides a soft feel with excellent strength.

The present brush assembly's application is particularly directed to use with livestock and barn animals such as horses, ponies, llamas, cattle and the like, as well as family pets such as dogs and cats. These animals are oftentimes exposed to infection through parasites, such as ticks, and would benefit from a brush assembly that provided a direct delivery system wherein medicament can be delivered quickly and efficiently to the animal's skin, without having to be rubbed in through the animal's coat. Direct delivery of the active ingredients of the product to the animal's skin and interstitials of the hair or fur of the coat provides optimal application without loss due to run-off from upper surface applications of the product. As a result, exposure and contact of the active ingredients to the individual applying same is mitigated, while the delivery of the active ingredients is achieved in a highly efficient manner.

Other applications of the brush assembly include use in the cleaning and/or treatment of surfaces of inanimate objects, such as cars or other smooth surfaces. Solutions in such case preferably involve cleaning products, water wash and waxing products for a clean finish. Base plates in such case, preferably involve soft bristled grooming tools and sponge surfaces.

The brush assembly includes a brush base attached to a hose and flow regulator. The direct application brush assembly comprises a molded brush base having an outer perimeter portion, perimeter shelf portion and a mid portion with a plurality of apertures integrate therein for delivery of a fluid. At least one base plate is provided, having grooming implementations integrated therein and is received on the perimeter shelf portion of the molded brush base. The brush assembly further comprises an ergonomical handle having a palm conforming top and symmetric finger indentation around front and side walls constructed to form an internal cavity and is attached to the outer perimeter portion of the brush base, the ergonomical handle is ambidextrous in nature for interchangeable handedness. A center cylinder is located within the internal cavity of the ergonomical handle and comprising a bladder with a bottom surface having a primary opening, a top surface, and a side wall having an orifice. The primary opening of the center cylinder is adapted to align with the mid portion of the brush base and the orifice of the side wall of the center cylinder is adapted to receive a hose for fluid delivery, which in turn is connected to a flow regulator. The hose includes a first end fitted with the flow regulator and a second end fitted to the orifice of the side wall of the center cylinder so that the hose delivers the fluid from the flow regulator into the bladder of the center cylinder. The flow regulator controls delivery of the fluid into the hose and visa vie the bladder of the center cylinder attached to the brush base, releasing the fluid through the apertures in the mid portion of the brush base.

The flow regulator operates to flush fluid through the hose and into the brush base. Fluid preferably is water or an aqueous solution. A mixing chamber may be attached to the flow regulator. This mixing chamber preferably contains a water soluble compound comprised of active ingredients. Water from the flow regulator is mixed with the compound within the mixing chamber to form a liquid solution, which is then delivered through the hose into the internal cavity and bladder of the center cylinder, through the apertures in the mid portion of the brush base, and onto the animal's coat. Upon exhaustion of the liquid solution the brush may be removed from the animal, or water may continue to flow through the hose to rinse the solution animal, such as if the liquid solution is a shampoo or soap solution. Generally stated, the invention consists of a brush base which releases fluid and/or liquid solution containing fragrance, perfume and/or other active compositions during brushing via a flow regulator. During the brushing action the flow regulator is activated and fluid flows through the hose into the orifice and into the internal cavity of the brush and into the bladder located therein to be delivered through the apertures of the brush base.

The base plate snap-fit onto the brush base includes grooming implementations, such as bristles, rounded, flat or pointy, a sponge, or bristles with channels/central apertures therein for further fluid delivery. The base plate is preferably composed of a flexible deformable membrane preferably made from rubber, typically with a thickness of 1/32 inch to 3/32 inch, up to 1/8 inch. Where the base includes bristles, these apertures provided for receiving the bristles are typically 0.010-0.60 inches, matching the outer diameter of the bristles used. The bristles are preferably polymeric bodies and a rounded end contacting hair. The bristles have a diameter ranging from 0.010 inch to 0.060 inches; where the bristles include channels or central apertures, the central apertures have a diameter ranging from 0.005 inch to 0.040 inches. The bristles are preferably permanently bonded to the base plate using glue or other attachment means. Alternatively, the base plate and bristles are composed of a flexible membrane formed via molding by an injection molding processes in one step to create a one piece unit which contains both the flexible deformable membrane and the bristles.

Assembly of the brush of this invention comprises the steps of:

1. Forming a brush base having an outer perimeter portion, perimeter shelf portion and a mid portion with a plurality of apertures integrate therein for delivery of a fluid;
2. Forming at least one base plate having grooming implementations integrated therein being received on the perimeter shelf portion of the molded brush base. The base plate if appointed to snap-fit onto perimeter portion and shelf of the brush base;
3. Forming a center cylinder comprising a bladder with a bottom surface having a primary opening, a top surface, and a side wall having an orifice;
4. Aligning the primary opening of the center cylinder with the mid portion of the brush base and attaching it thereto. Attachment may be achieved by way of snap-fit and is an fluid tight fit so that fluid does not escape through sides of the primary opening;
5. Forming an ergonomical handle having a palm conforming top and finger indentation sides constructed to form an internal cavity, the ergonomical handle being ambidextrous in nature for interchangeable handedness;
6. Attaching the ergonomical handle to the outer perimeter portion of the brush base so that the center cylinder is located within the internal cavity. This attachment is preferably achieved by snap-fit for form a tight fitting fluid tight fit;
7. Connecting a second end of a hose to the orifice of the side wall of the center cylinder;
8. Connecting a first end of the hose to a flow regulator for delivery of the fluid into the bladder of the center cylinder;
9. Optionally, a mixing chamber containing a substantially water soluble compound having an active ingredient may be attached to the flow regulator so that as water travels through the flow regulator into the mixing chamber the compound is dissolved to form a liquid solution.
10. Now the assembled brush is ready to use. It delivers fluid and/or the liquid solution with active ingredients, such as perfume, fragrance and/or other active compositions, when the brush is used to brush human or pet hair or livestock. Once the liquid solution perfume, fragrance and/or active composition is exhausted, water may continue to run through the flow regulator and hose into the brush base and onto the animal's fur or hair to rinse any solution off of the animal's coat. Upon exhaustion of the compound in the mixing chamber, the mixing chamber is removed and re-filled or replaced with a new mixing chamber.

Plastic materials have particular application in manufacturing the subject brush assembly, specifically including polyvinyl chloride (PVC) and acrylonitrile butadiene styrene (ABS). A vast array of animal health care products, soaps, shampoos, compounds and solutions can be applied through use of the subject brush, such as those set forth in Table I hereinbelow.

TABLE I

| | |
|---|---|
| ULTRASHIELD ™ | Insecticide & Repellent |
| SUPERSHIELD RED ™ | Water-Resistant Fly Repellent |
| SUPERSHIELD GREEN ™ | Horse Spray, Herbal Gel & Super Concentrate |
| SHOWSHEEN ™ | Hair Polish & Detangler |
| ULTRASCREEN ™ | Maximum Sun Protection Lotion & Fade Protection |
| SUPERPOO & SHOWCLEAN ™ | Mane & Tail Whitener & Stain Remover |
| ABSORBINE ® | Varying Application; muscle, joint and arthritis pain reliever; |

FIG. 1 illustrates a top side view of the brush assembly, shown generally at 10. In this view, the optional mixing chamber is attached to the flow regulator. Brush assembly 10 includes a molded brush base 11 having an outer perimeter portion 12, perimeter shelf portion 13 and a mid portion 14 with a plurality of apertures 15 integrate therein for delivery of a fluid. At least one base plate 20 is provided, having grooming implementations integrated therein, herein shown as teeth or bristle elements 21, and is received on the perimeter shelf portion 13 of the molded brush base 11. Preferably, the base plate 20 is removable via snap-on attachment to the brush base 11 at the outer perimeter portion 12 and perimeter shelf portion 13 regions. Preferably, the brush base 11 and base plate 20 are composed of flexible deformable membranes. The base plate may be disposable. Bristles elements 21 are herein shown having a cone shape, but bristle elements 21 may have an elongated rectangular or cylindrical shape, or any suitable shape for combing between hairs or fur of the coat of an animal. Alternatively, the bristle elements 21 may have a rounded top in order to provide massaging treatment.

The brush assembly further comprises an ergonomical handle 30 having a palm conforming top 31 and symmetric finger indentations 32 around front 33 and side walls 34 constructed to form an internal cavity 35. The ergonomical handle 30 is attached to the outer perimeter portion 12 of the brush base 11. Construction of the ergonomical handle 30 is ambidextrous in nature for interchangeable handedness. That is to say, the palm conforming top 31 and symmetric finger indentations 32 integrated in the front 33 and side walls 34 allow a right-handed user or a left-handed user to comfortably grip the ergonomical handle 30.

A center cylinder 40 is located within the internal cavity 35 of the ergonomical handle 30 and comprises a bladder 41 with a bottom surface 42 having a primary opening 43, a top surface 44, and a side wall 45 having an orifice 46. The primary opening 43 of the center cylinder 40 is adapted to align with the mid portion 14 of the brush base 11 and the orifice 46 of the side wall 45 is adapted to receive a hose 50 for fluid delivery, which in turn is connected to a flow regulator. The hose 50 includes a first end fitted with the flow regulator 60 and a second end fitted to the orifice 46 of the side wall 45 of the center cylinder 40 so that the hose 50 delivers the fluid from the flow regulator into the bladder 41 of the center cylinder 40. Herein, flow regulator 60 is attached to an optional mixing chamber 70 for mixing water with a solution or treatment/medicament/shampoo in the mixing chamber 70 to create a solution for delivery to the brush 10. The flow regulator controls delivery of the fluid into the hose 50 and visa vie the bladder 41 of the center cylinder 40 attached to the brush base 11, releasing the fluid through the apertures 15 in the mid portion 14.

Hose 50 supplies fluid to the center cylinder 40, and to the brush base 11. Hose 50 is lightweight, and has a relatively small diameter with varying length and thickness. Hose 50 includes a first end 52 attached to the flow regulator 60 preferably by way of regulator screw top 66. Flow regulator 60 further comprises a body portion 67 appointed to be attached to a fluid or water supply and includes a threaded portion 68 therein for mating with threads or grooves of the regulator screw top 66 or an optional mixing chamber 70, as herein shown. As fluid is delivered from flow regulator 60 it passes into hose 50 and traverses orifice 46 into internal cavity 40 for delivery into bladder 41 and brush base's 11 apertures 15. This fluid may be water or another fluid source. Flow regulator 60 controls delivery of fluid into hose 50 and visa vie bladder 41 of center cylinder 40 located in the brush base 11 when brushing fur or hair, releasing fluid through apertures 15 onto the animal's fur or hair wherein it is immediately brushed with bristles, or sponged. With this arrangement, the brush assembly is easy to maneuver and fluid supply can be continuous or intermittent.

In the embodiment shown in FIG. 1 the optional mixing chamber 70 is incorporated into the brush assembly. The optional mixing chamber 70 houses a compound appointed to be mixed with water delivered from flow regulator 60 to form a liquid solution that is appointed to be fed through hose 50 into bladder 41 for dissemination of the liquid solution onto the fur or hair. The liquid solution preferably includes active ingredients comprising grooming and cleaning products for a coat of the horse and livestock, and may include shampoos, soaps, perfumes, fragrances and/or other active composition comprising insect repellant, flea repellants and treatments, tic repellant, mane and tail hair conditioning compositions, dye compositions, moisturizing ingredients, or antibacterial compounds.

Preferably the compound housed in the mixing chamber 70 is a semi-solid compound soluble in an aqueous environment to form the liquid solution appointed for delivery through hose 50. Most preferably, this semi-solid compound is a shampoo or soap. In application, the soap or shampoo in semi-solid form in the cylindrical mixing chamber 70 dissolves slowly as water is forced into mixing chamber 70 by way of flow regulator 60. As the semi-solid soap compound dissolves it suds or soaps-up to provide a soapy liquid solution that is delivered through hose 50. After approximately three to five minutes, the semi-solid becomes used-up and the soapy liquid solution begins to become diluted and consist substantially as water.

Water continues to flow through flow regulator 60, (emptied) mixing chamber 70 and hose 50 to clean and rinse the animal. Mixing chamber 70 is preferably constructed as a cylinder having a chamber top 71 that mates with regulator screw top 66, and a chamber bottom 72 that screws onto or otherwise attaches to threaded portion 68 of flow regulator 60. Mixing chamber 70 is preferably a secondary "sale" item or after market replacement item, with replacement mixing chambers available. Washing horses and livestock can be an untidy situation with buckets, soap, sponges, and rinse water being necessary. Use of the brush assembly along with the optional mixing chamber provides the ability to deliver the soap and water in a highly efficient, tidy manner. While at the same time, the ability to get the soap deep within the fur follicles yields optimal cleaning of the animal's coat and/mane.

FIGS. 2a, 2b and 2c illustrate top, bottom-side and bottom views of the embodiment of the brush assembly of FIG. 1, shown in the assembled condition. Additionally, FIGS. 3a and 3b show cross-sectional cut-out views taken along X-X of FIG. 2a. Referring to FIGS. 2a-2c and 3a, 3b, molded brush base's 11 outer perimeter portion 12 and perimeter shelf portion 13 are attached to base plate 20. Attachment is preferably achieved by way of snap-on fastening, alternatively, attachment may be achieved through use of hook and loop fasteners, such as that sold under the trade name Velcro, matingly located on the back of the base plate 20 and on the perimeter shelf portion 13 of the brush base 11. Water or solution is delivered through mid portion 14 of brush base 11 by way of the plurality of apertures 15 integrate therein. Preferably theses apertures have a diameter ranging from 0.005 inch to 0.060 inches.

Brush base 11 may be constructed of a plastic material such as a polycarbonate blend. Preferably the brush base is constructed with Santoprene™ or a thermoplastic elastomer (TPE) over-mold to provide durability while protecting the scrubbing surface as it provides a soft feel with excellent strength. What is more, base plate 20 is also preferably composed of a Santoprene™ or a thermoplastic elastomer (TPE) over-mold to provide durability and a soft feel. Base plate 20 is shown herein with bristle elements 21. Rather than bristle elements 21, the grooming implement on the base plate 20 may be a sponge as shown in later figures herein. Interchangeability of base plate 20 allows a user to use the optimal grooming tool needed by simply changing out the base plate—bristles for brushing or scrubbing, or a sponge for softer applications. Bristles elements 21 are herein shown having a cone shape, but bristle elements 21 may have an elongated rectangular or cylindrical shape, or any suitable shape for combing between hairs or fur of the coat of an animal. Alternatively, the bristle elements 21 may have a rounded top in order to provide massaging treatment. Center cylinder 40 is housed within ergonomical handle 30 and brush base 11.

The mid portion 14 of the molded brush base 11 includes parallel interior walls 111 (best seen in FIGS. 3a, 3b and FIG. 6a) adapted to receive a rim 46 of the primary opening 43 of the bottom surface 42 of the center cylinder 40 for substantially sealing the center cylinder 40 to the brush base 11 for the fluid delivery through the plurality of apertures 15 integrated within the mid portion 14. The ergonomical handle's 30 palm conforming top 31 and symmetric finger indentations 32 around front 33 and side walls 34 provides optimal comfort to either a left-handed user or a right-handed user interchangeably. An internal cavity 35 is formed within the ergonomical handle for accommodating the center cylinder 40 (not shown in FIGS. 2a-2c). The ergonomical handle 30 is preferably constructed having two parallel mating portions 335a, 335b (best illustrated in FIG. 4). Each parallel mating portion 335a, 335b snaps together and in turn snaps to the brush base 11 in a tight, water sealed manner to prevent any fluid leakage from the brush and to optimally contain the center cylinder 40. What is more, the parallel mating portions 335a, 335b are preferably constructed having a series of hulls 336 therein for durability of the claim-like shaped handle 30. A center cylinder encasement wall 337 is also preferably provided for enhanced securing of the center cylinder 40, preventing the center cylinder 40 from moving within the handle 30. The ergonomical handle 30 is snap-fit attached to the outer perimeter portion 12 of the brush base 11 in a water tight manner. Hose 50 is shown connected to the orifice 46 region of the center cylinder 40 which preferably includes a slightly tapered configuration/tapered portion 47 for hose 50 fit; in turn the hose 50 is connected to the flow regulator. Preferably, the primary opening 43 of the center cylinder 40 includes a deformable flexible membrane snap cap 338 which includes membrane apertures 339 integrated therein. These membrane apertures 339 are in alignment with the apertures 15 of the mid portion of the brush base 11 for fluid delivery. In turn, mid portion 14 wither apertures 15 of brush base 11 may be constructed of a flexible deformable membrane.

FIG. 4 illustrates the construction of the ergonomical handle while FIGS. 5a, 5b and 5c illustrate top, side and front views of the handle. The ergonomical handle 30 is preferably constructed having two parallel mating portions 335a, 335b that snap together at a snap interface 403a, 403b, and in turn snaps to the brush base at bottom snap interface 404a in a tight, water sealed manner to prevent any fluid leakage from the brush and to optimally contain the center cylinder. The parallel mating portions 335a, 335b are preferably constructed having the series of hulls 336 for durability of the claim-like shaped handle 30. The center cylinder encasement wall 337 is also preferably provided for enhanced securing of and mitigating movement of the center cylinder therein. The ergonomical handle's 30 palm conforming top 31 and symmetric finger indentations 32 around front 33 and side walls 34 provides optimal comfort to either a left-handed user or a right-handed user interchangeably. What is more, the ergonomical handle 30 includes a back wall 405. The two parallel mating portions 335a, 335b include c-shaped or arc shaped cut-outs 406a, 406b so that when the two parallel mating portions 335a, 335b are snapped together, the c-shaped cut-outs form a circular or arced orifice 407 for accommodating the central cylinder's 40 tapered portion 47, which in turn receives the hose 50.

The brush yields ergonomic features by way of its ergonomical handle construction. Preferably, the ergonomical handles has measurements of 4"×5"×2" to provide excellent gripping force for longer period of time for the average sized user. The ergonomical handle construction provides ambidexterity so both left and right-handed users can use it comfortably. The symmetric finger indentations extend around the front and sides of the brush to provide the user with an excellent gripping surface. The top rounded surface on the ergonomical handle provides a more comfortable interface for the palm and fingers, which also add to the gripping comfort. The ergonomical handle is preferably constructed of PC-ABS blend, or alternatively ABS, keeping the brush lightweight while maintaining durability. Preferably the brush base is constructed with Santoprene™ or a thermoplastic elastomer (TPE) over-mold to provide durability while protecting the scrubbing surface as it provides a soft feel with excellent strength.

FIGS. 6a and 6b illustrated a top and bottom view of the brush base. Molded brush base 11 is constructed, preferably via injection molding, having outer perimeter portion 12, perimeter shelf portion 13 and mid portion 14 appointed with a plurality of apertures 15. A base plate (not shown in the Figures) is appointed to attach onto perimeter shelf portion 13 and/or outer perimeter portion 12, covering shelf portion 13 by way of snap-on fastening, alternatively, attachment may be achieved through use of hook and loop fasteners, such as that sold under the trade name Velcro, matingly located on the back of the base plate 20 and on the perimeter shelf portion 13 of the brush base 11. Herein shown are snap-on tongue members 417 which protrude from brush base 11. These snap-on tongue members 417 are received in mating grooves integrated within the bottom side of the base plate appointed to be attached to the perimeter shelf portion 13 of the brush base. Preferably, the snap-on tongue member 417 have a shallow depth 418 ranging from 0.06 inches up to 0.5 inches, and is dependent upon the thickness of the base plate to be attached.

Water or solution is delivered through mid portion 14 of brush base 11 by way of the plurality of apertures 15 integrate therein. Preferably theses apertures have a diameter ranging from 0.005 inch to 0.060 inches. Preferably brush base 11 is constructed of thermoplastic rubber such as that sold under the trade name Santoprene™ or a thermoplastic elastomer (TPE) over-mold to provide durability while protecting the scrubbing surface as it provides a soft feel with excellent strength. Alternatively, brush base 11 may be constructed of PC-ABS blend, or alternatively ABS, keeping the brush lightweight while maintaining durability. The mid portion 14 of the molded brush base 11 includes parallel interior walls 111 which form a groove 411 adapted to receive the rim 46 of the primary opening 43 of the bottom surface 42 of the center cylinder 40 for substantially sealing the center cylinder 40 to the brush base 11 for the fluid delivery through the plurality of apertures 15 integrated within the mid portion 14. Preferably, mid portion 14 is curved, so that when viewed from the interior mid portion 14 is concave (FIG. 6a), while when viewed from the exterior (as in FIG. 6b) mid portion 14 is slightly convex. What is more, preferably mid portion 14 is raised so that mid portion 14 extends above outer perimeter shelf 13 and outer perimeter 12, the depth of which is illustrated in FIG. 6b along line 450. This depth may range from ⅛ inch to ¾ inch, and is dependent upon the thickness of the base plate to be attached to the brush base 11, so that preferably, mid portion 14 lies substantially flush with the base plate when it is attached to the brush base. Brush base 11 also includes an upward stand 413 with a stand arc 414 for receiving, holding and stabilizing tapered portion 47 of the center cylinder 40 (not shown). Mid portion 14 may be composed of a different material than the remainder of the brush base 11. In such a case, mid portion 14 may be constructed of a flexible deformable membrane with apertures integrated therein. Additionally, brush base 11 preferably includes an upright member 422 for stabilizing and securing the center cylinder.

FIGS. 7a, 7b and 7c illustrate base plates appointed to be attached to the brush base. At least one base plate 701 is provided having grooming implementations integrated therein. FIG. 7a shows a bottom view of the base plate 701 having bristle elements 721; FIG. 7b shows a top view of the base plate 701 with bristle elements 721; FIG. 7c shows a top view of an alternative base plate 750 having a sponge element 751. Each base plate 701, 750 includes a bottom side 702, 752, top side 703, 753, a center opening 704, 754 corresponding in size and shape to the mid portion of the brush base, and grooming implements 705, 755. In FIGS. 7a and 7b the grooming implements 705 are shown as bristle elements 721, while in FIG. 7c the grooming implements 705 are shown as a sponge element 751. Base plate 701, 750 is constructed, preferably via injection molding and is appointed to attach onto perimeter shelf portion and/or outer perimeter portion of the brush base by way of snap-on fastening, alternatively, attachment may be achieved through use of hook and loop fasteners, such as that sold under the trade name Velcro, matingly located on the back of the base plate and on the perimeter shelf portion of the brush base. Herein, snap-on tongue receiving members 717, 757 which are grooved in base plate 701, 750. These snap-on tongue receiving members 717, 757 are appointed to receive in the snap-tongue members of the brush base as discussed in regards to FIGS. 6a and 6b and are integrated within the bottom side 702, 752 of the base plate 701, 750 appointed to be attached to the perimeter shelf portion of the brush base. Preferably, the snap-on tongue receiving members 717, 757 have a shallow depth 718, 758 corresponding to the depth of the snap-on tongue members of the brush base, having a shallow depth 418 ranging from 0.06 inches up to 0.5 inches, and are dependent upon the thickness of the base plate to be attached. As shown, preferably a plurality of snap-on tongue receiving members 717, 757 are provided, as well as a plurality of snap-on tongue members are provided in the brush base. Although such attachment is illustrated, attachment may be accomplished in any number of currently known means for snap-on components, such as tongue and groove, hook and loop, screw-attachment, etc. Bristles elements 721 are herein shown having a cone shape, but bristle elements 721 may have an elongated rectangular or cylindrical shape, or any suitable shape for combing between hairs or fur of the coat of an animal. Alternatively, the bristle elements 721 may have a rounded top in order to provide massaging treatment. What is more, sponge 751 may have varying thicknesses, preferably ranging from 0.5 inches to 3 inches in depth depending on the needs of the user.

FIGS. 8a and 8b show top and bottom views of the center cylinder. Center cylinder 40 comprises a bladder 41 with a bottom surface 42 having a primary opening 43, a top surface 44, and a side wall 45 having an orifice 46. The primary opening 43 of the center cylinder 40 is adapted to align with the mid portion of the brush base and the orifice 46 of the side wall 45 is adapted to receive a hose for fluid delivery, which in turn is connected to a flow regulator. At orifice 46, side wall 45 includes a tapered portion 47 which forms an arm 848 which extends from the ergonomical handle and brush base for connection to the hose.

FIG. 9 shows an alternative embodiment of the brush assembly wherein the base plate includes bristle elements having channels with apertures integrated therein, shown generally at 900. In this embodiment brush assembly 900 includes a molded brush base 911 having an outer perimeter portion 912, perimeter shelf portion 913 and a mid portion 914 with a plurality of apertures 915 integrate therein. Mid portion 914 is constructed of a flexible deformable membrane. At least one base plate 920 is provided, having grooming implementations integrated therein, herein shown as teeth or bristle elements 921 having channels with apertures 931 integrated therein. The base plate 920 is composed of a flexible deformable membrane with the bristles 921 attached thereto, or alternatively made via injection molding with the bristles 921 integrated therein. Base plate 920 is received on the perimeter shelf portion 913 of the molded brush base 911. The brush assembly further comprises an ergonomical handle 930 as described hereinabove in regards to the figures. A center cylinder 940 is located within the internal cavity 935 of the ergonomical handle 930 and comprises a bladder 941 with a bottom surface 942 having a primary opening 943. The primary opening 943 of the center cylinder 940 is adapted to align with the mid portion 914 of the brush base 911 and the orifice 946 of the side wall 945 is adapted to receive a hose 950 for fluid delivery, which in turn is connected to a flow regulator. The hose 950 includes a first end fitted with the flow regulator 960 and a second end fitted to the orifice 946 of the side wall 945 of the center cylinder 940 so that the hose 950 delivers the fluid from the flow regulator into the bladder 941 of the center cylinder 940. Herein, flow regulator 960 is attached to an optional mixing chamber 970 for mixing water with a solution or treatment/medicament/shampoo in the mixing chamber 970 to create a solution for delivery to the brush 900. In this embodiment the perimeter shelf portion 913 is shallow so that the mid portion 914 of the brush base 911 essentially makes-up a substantial portion of the brush base. Since the fluid and/or liquid solution has to travel along the length of the bristle through the channel and central aperture 931, it is important that the contact angle of the fluid and/or liquid solution with the bristle be in the range of 2 degrees to 30 degrees. If the contact angle exceeds this range, the fluid and/or gel/liquid solution may not easily penetrate the central aperture and be delivered to the tip of the bristle in the first embodiment or to the tip and side surface of the bristle in the second embodiment.

An optional porous sponge or soluble disk 1001 may be inserted into the bladder 941 of the center cylinder 940. This optional porous sponge or soluble disk may be a gel, liquid, solid, or semi-solid formulation that is water soluble and contains fragrance, perfume and/or other active composition. Water delivered by way of the flow regulator and hose enters bladder 941 and mixes with the water soluble formulation within the porous sponge or soluble disk dissolving the formulation to form a liquid solution which is then delivered through apertures 914 of the brush base 911 which in turn is in alignment with channels with apertures integrated therein 931 with bristles 921 onto the animal's coat. Upon exhaustion of the formulation within the sponge or dissolving of the soluble disk, water may continue to flow through, rinsing the formulation off of the animal's coat, such as when the formulation is a soap or shampoo. In this optional arrangement, the flow regulator would preferably not be attached to the optional mixing chamber.

Figure 9A:
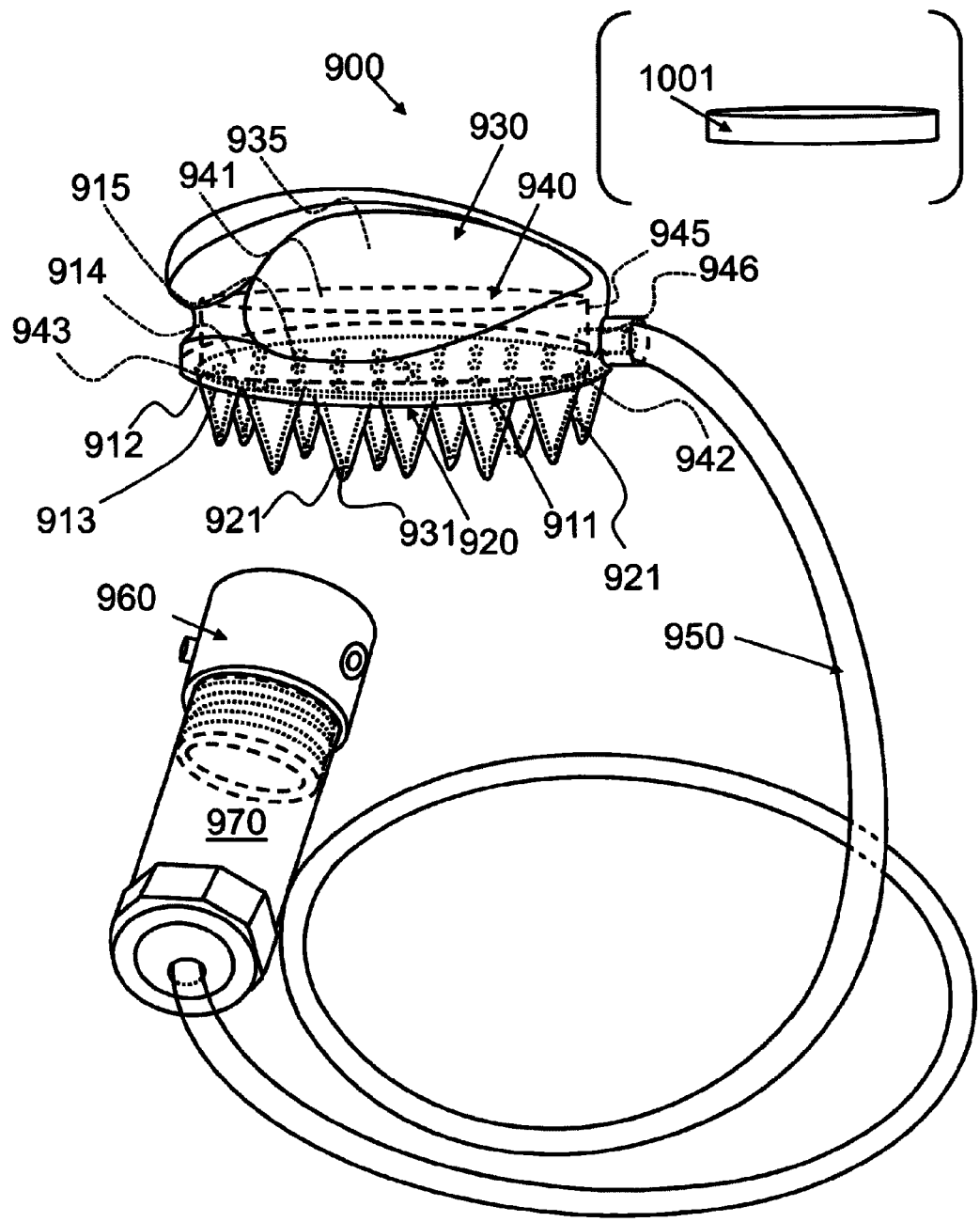
FIG. 9a shows an alternative embodiment of the brush assembly wherein the base plate includes bristle elements having channels with apertures integrated therein, shown generally at 900.
Figure 9B:
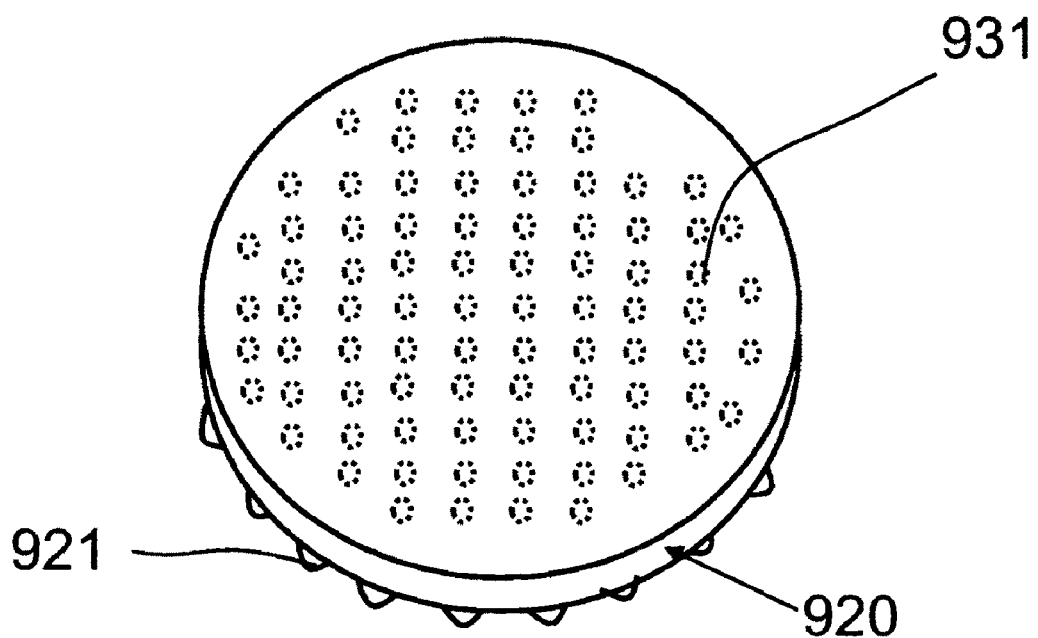
Figure 9C:
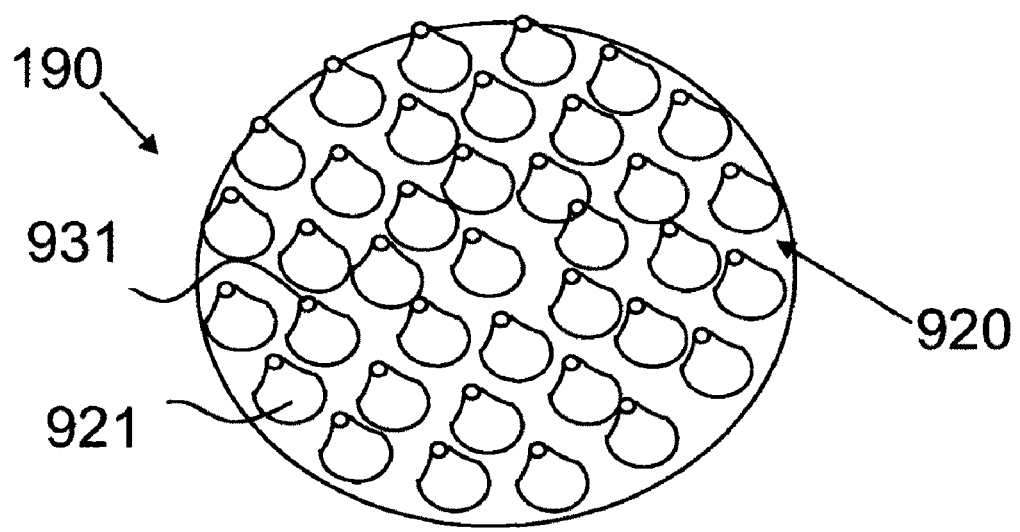

FIG. 9b shows a top view of an alternative embodiment of the base plate constructed in FIG. 9a. FIG. 9c shows a bottom view of an alternative embodiment of the base plate constructed in FIG. 9a. As shown, base plate 920 includes bristles 921 having channels with apertures 931 integrated therein for fluid delivery. These channels with apertures 931 are in alignment with the apertures 915 of the mid portion 914 of brush base 911. Both mid portion 914 and base plate 920 are composed of a flexible deformable membrane. Preferably, in this embodiment, base plate 920 is integrated into mid portion 914, making-up mid portion 914 of brush base 911.

The brush assembly disclosed herein can be modified in numerous ways without departing from the scope of the invention. Optional porous sponge can be replaced by a plastic silicon shell having aperture leading to the soluble formulation including perfume, fragrance and/or other active compositions.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A direct application brush assembly, comprising:
   a. a molded brush base having an outer perimeter portion, perimeter shelf portion and a mid portion being constructed of a flexible deformable membrane having a plurality of apertures integrate therein for delivery of a fluid;
   b. at least one base plate having grooming implementations integrated therein being received on said perimeter shelf portion of said molded brush base;
   c. an ergonomical handle having a palm conforming top and symmetric finger indentation around front and side walls constructed to form an internal cavity and being attached to said outer perimeter portion of said brush base, said ergonomical handle being ambidextrous in nature for interchangeable handedness;
   d. a center cylinder being located within said internal cavity of said ergonomical handle and comprising a bladder with a bottom surface having a primary opening, a top surface, and a side wall having an orifice;
   e. said primary opening of said center cylinder being adapted to align with said mid portion of said brush base, and said primary opening of said center cylinder aligns with said mid portion of said brush base in a substantially sealed condition;
   f. said orifice of said side wall of said center cylinder being adapted to receive a hose for fluid delivery;
   g. a flow regulator;
   h. said hose having a first end fitted with said flow regulator and a second end fitted to said orifice of said side wall of said center cylinder so that said hose delivers said fluid from said flow regulator into said bladder of said center cylinder; and
   i. said mid portion of said molded brush base including parallel interior walls adapted to receive a rim of said primary opening of said bottom surface of said center cylinder for substantially sealing said center cylinder to said brush base for said fluid delivery through said plurality of apertures integrated within said mid portion of said brush base;

whereby said flow regulator controls delivery of said fluid into said hose and visa vie said bladder of said center cylinder attached to said brush base, releasing said fluid through said apertures in said mid portion of said brush base.

2. A brush assembly as recited by claim 1, wherein a plurality of different base plates are provided wherein having various said grooming implementations integrated therein.

3. A brush assembly as recited by claim 1, wherein said grooming implementation of said base plate is a sponge to form a sponge base plate.

4. A brush assembly as recited by claim 1, wherein said grooming implementation of said base plate is a plurality of teeth to from a massaging plate appointed for scrubbing and massaging said animal.

5. A brush assembly as recited by claim 4, wherein said each of said teeth has a circular cross section with a central channel with an aperture along a length of said teeth appointed for further delivery of said fluid through each of said teeth.

6. A brush assembly as recited by claim 1, wherein said ergonomical handle includes non-slip means.

7. A brush assembly as recited by claim 6, wherein said palm conforming top of said ergonomical handle includes texture to mitigate slippage during use.

8. A brush assembly as recited by claim 6, wherein said finger indentation sides of said ergonomical handle include texture to mitigate slippage during use.

9. A brush assembly as recited by claim 1, wherein said brush assembly is composed of a polymeric material to provide a durable lightweight brush assembly.

10. A brush assembly as recited by claim 1, wherein said ergonomical handle includes a padded cushion material integrated therein for comfort.

11. A brush assembly as recited by claim 10, wherein said palm conforming top of said ergonomical handle includes a padded material integrated therein.

12. A brush assembly as recited by claim 1, wherein said fluid is water.

13. A brush assembly as recited by claim 1 comprising a mixing chamber housing a compound appointed to be mixed with water delivered from said flow regulator to form a liquid solution that is appointed to be fed through said hose into said bladder of said center cylinder and fed through said apertures of said mid portion of said brush base for dissemination of said liquid solution.

14. A brush assembly as recited by claim 13, wherein said liquid solution includes active ingredients comprising grooming and cleaning products for a coat of an animal.

15. A brush assembly as recited by claim 13, wherein said liquid solution includes active ingredients comprising animal health care products.

16. A brush assembly as recited by claim 13, wherein said liquid solution includes perfume, fragrance and/or other active composition comprising insect repellant, flea repellants and treatments, tic repellant, mane and tail hair conditioning compositions, dye compositions, moisturizing ingredients, or antibacterial compounds.

17. A brush assembly as recited by claim 13, wherein said liquid solution consists of active ingredients selected from a group consisting of insect repellants, flea and/or tic compounds, muscle treatments, therapeutic or moisturizing compounds, or antibacterial compounds.

18. A brush assembly as recited by claim 13, wherein said liquid solution consists of active ingredients selected from a group consisting of perfumes, fragrance, hair-conditioning and detangle products, sun protection lotions, mane and tail whiteners and stain removers, dye compositions, fragrances or other hair/fur/coat-care related products.

19. A brush assembly as recited by claim 13, wherein said mixing chamber is disposable and replacement mixing chambers are available.

20. A brush assembly as recited by claim 13, wherein said compound housed in said mixing chamber is a semi-solid compound soluble in an aqueous environment to form said liquid solution appointed for delivery through said hose and into said bladder of said center cylinder.

21. A brush assembly as recited by claim 20, wherein said semi-solid compound is a shampoo.

22. A brush assembly as recited by claim 1, wherein a porous sponge or soluble disk is provided to be inserted within said bladder of said center cylinder, wherein said porous sponge or soluble disk is water soluble and contains active ingredients and dissolves as fluid enters said bladder by way of said hose and said flow regulator.

23. A brush assembly as recited by claim 1, wherein said base plate is disposable.

24. A brush assembly as recited by claim 1, wherein said ergonomical handle has a diameter of 4 inches, length of 5 inches and height of 2 inches.

25. A method for making a direct delivery brush assembly that releases a fluid, comprising the steps of:
  a. forming a brush base having an outer perimeter portion, perimeter shelf portion and a mid portion with a plurality of apertures integrate therein for delivery of a fluid;
  b. forming at least one base plate having grooming implementations integrated therein being received on said perimeter shelf portion of said molded brush base;
  c. forming a center cylinder comprising a bladder with a bottom surface having a primary opening, a top surface, and a side wall having an orifice;
  d. aligning said primary opening of said center cylinder with said mid portion of said brush base and attaching it thereto;
  e. forming an ergonomical handle having a palm conforming top and finger indentation sides constructed to form an internal cavity, said ergonomical handle being ambidextrous in nature for interchangeable handedness;
  f. attaching said ergonomical handle to said outer perimeter portion of said brush base so that said center cylinder is located within said internal cavity;
  g. connecting a second end of a hose to said orifice of said side wall of said center cylinder;
  h. connecting a first end of said hose to a flow regulator for delivery of said fluid into said bladder of said center cylinder;

whereby said flow regulator controls delivery of said fluid into said hose and visa vie said bladder of said center cylinder attached to said brush base, releasing said fluid through said apertures in said mid portion of said brush base.

* * * * *